J. R. McGIFFERT.
MACHINE FOR LOGGING.
APPLICATION FILED SEPT. 13, 1909.
964,534.
Patented July 19, 1910.
5 SHEETS—SHEET 3.
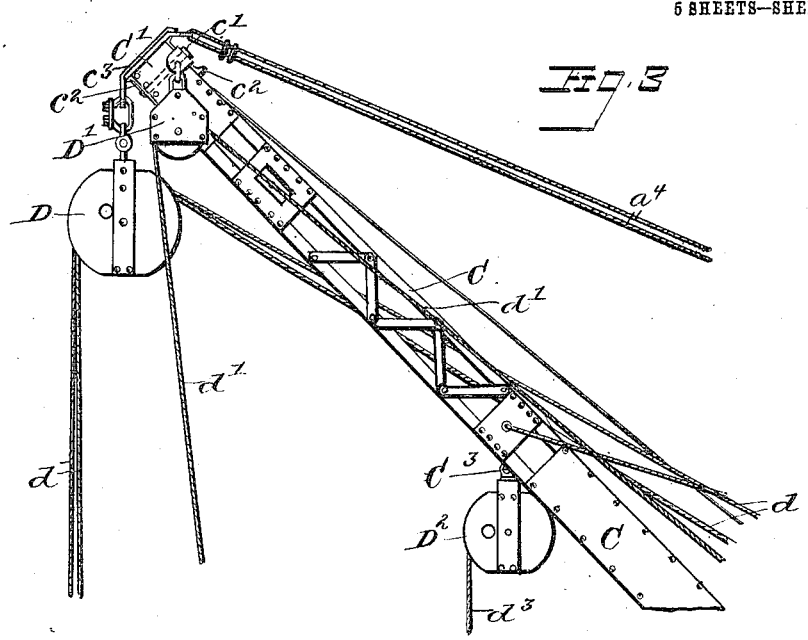
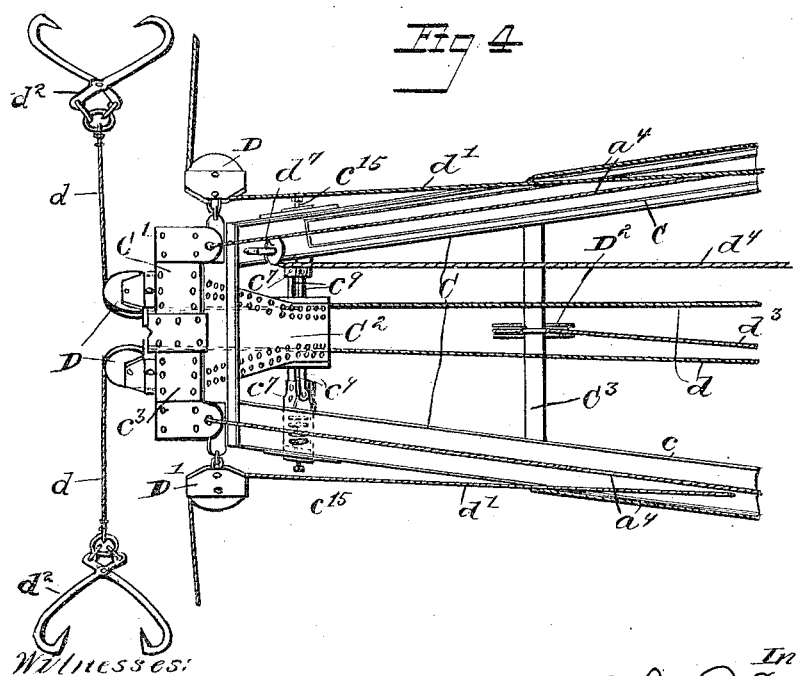

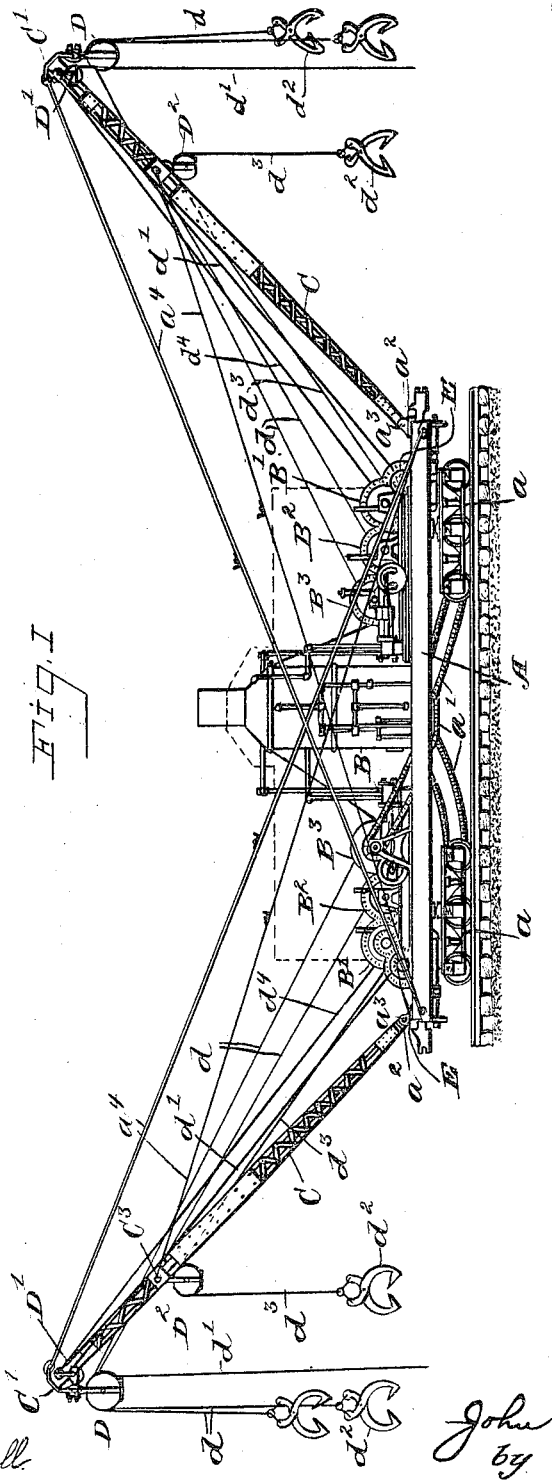

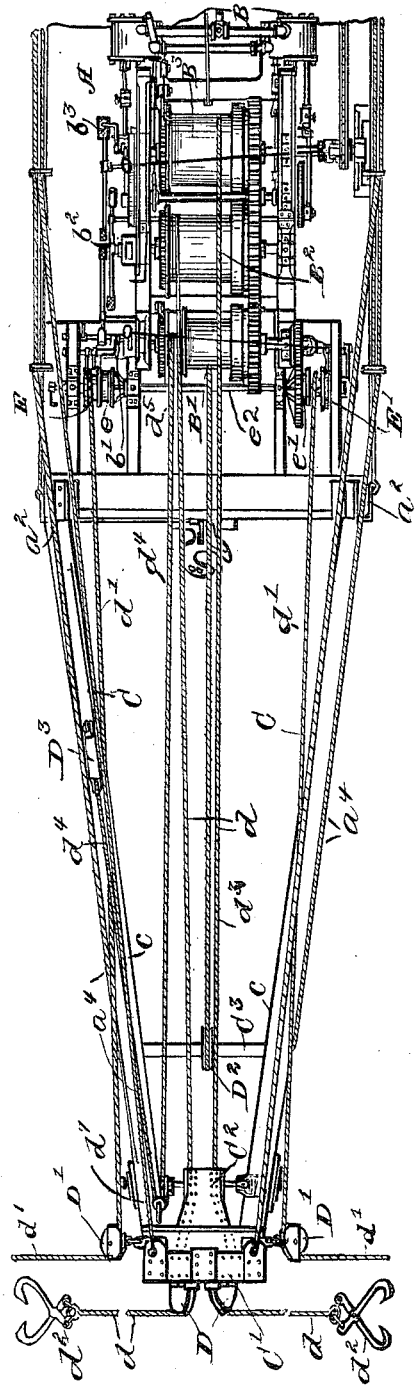

J. R. McGIFFERT.
MACHINE FOR LOGGING.
APPLICATION FILED SEPT. 13, 1909.

964,534.

Patented July 19, 1910.

5 SHEETS—SHEET 4.

Witnesses.
Anna L. Gill
Jno. F. Oberlin

Inventor.
John R. McGiffert
by J. B. Fay
Attorney.

J. R. McGIFFERT.
MACHINE FOR LOGGING.
APPLICATION FILED SEPT. 13, 1909.
964,534.
Patented July 19, 1910.
5 SHEETS—SHEET 5.
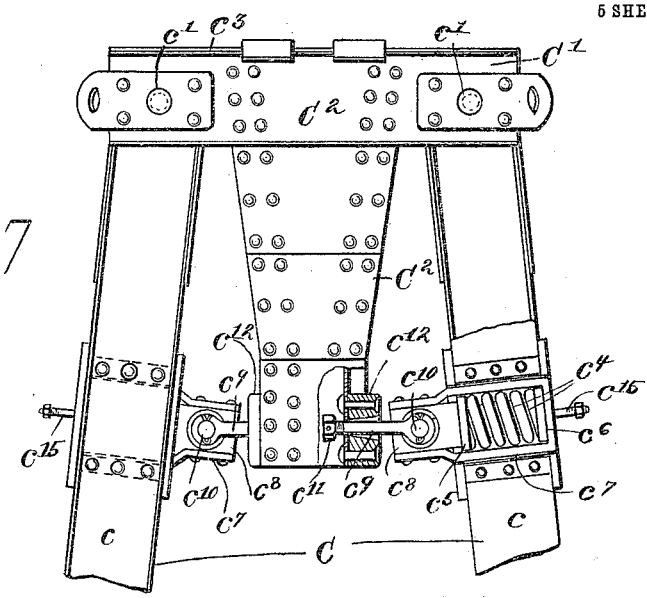
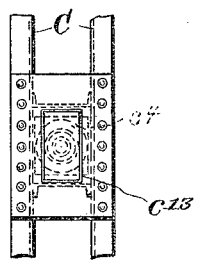
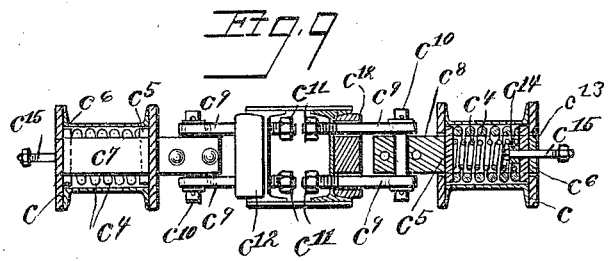
Witnesses:
Anna L. Gill
Jno. F. Oberlin
Inventor:
John R. McGiffert
by J. B. Fay
Attorney.
THE NORRIS PETERS CO., WASHINGTON, D. C.

UNITED STATES PATENT OFFICE.

JOHN R. McGIFFERT, OF DULUTH, MINNESOTA, ASSIGNOR TO CLYDE IRON WORKS, OF DULUTH, MINNESOTA, A CORPORATION OF MINNESOTA.

MACHINE FOR LOGGING.

964,534.

Specification of Letters Patent.

Patented July 19, 1910.

Application filed September 13, 1909. Serial No. 517,439.

*To all whom it may concern:*

Be it known that I, JOHN R. MCGIFFERT, a citizen of the United States, and a resident of Duluth, county of St. Louis, and State of Minnesota, have invented a new and useful Improvement in Machines for Logging, of which the following is a specification, the principle of the invention being herein explained, and the best mode in which I have contemplated applying that principle, so as to distinguish it from other inventions.

The present machine, while it may be characterized in general as a logging machine, is more specifically designed for use in skidding logs, that is, in dragging logs in from positions more or less remote from the point where they are to be loaded, by means of cables or lines paid out from the machine and then wound in after being attached to one end of the log.

In certain of its general features, the present machine resembles that forming the subject matter of my Patent No. 875,096, dated December 31, 1907. Thus, for example, four skidding lines are provided, two at each end, such lines being capable of independent operation so that logs may be skidded in from both sides simultaneously.

The object of the present invention is the provision of an improved construction of boom for use on a skidding machine of the kind in hand, including with the boom the disposition of the several lines that pass thereover; together with an improved arrangement and construction of the hoisting mechanism or winding drums for operating certain of said lines.

To the accomplishment of these and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

Figure 5:
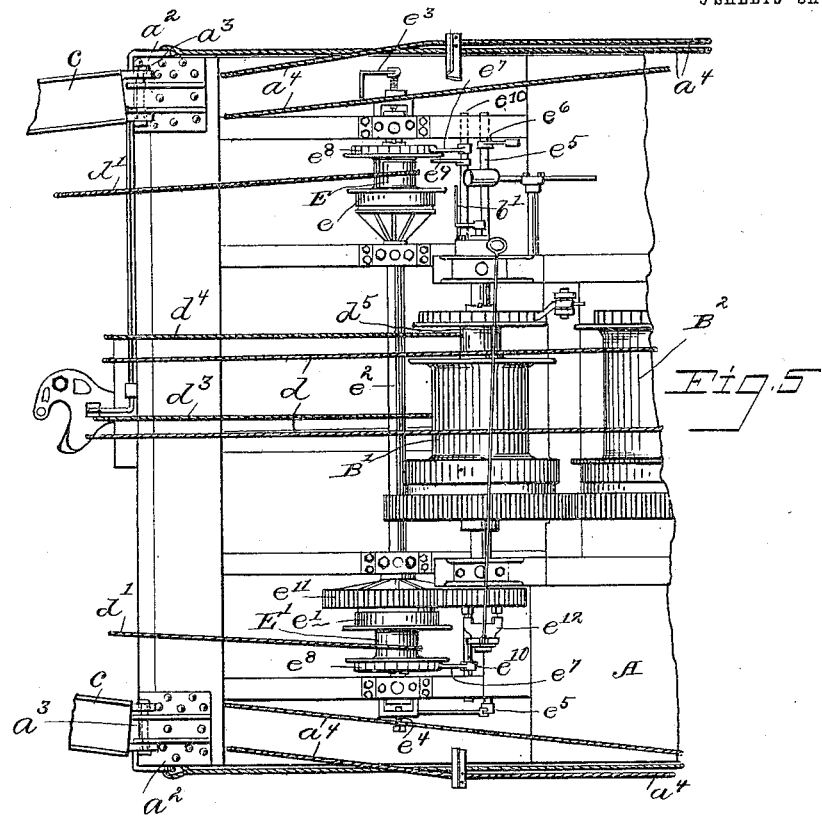
Figure 6:
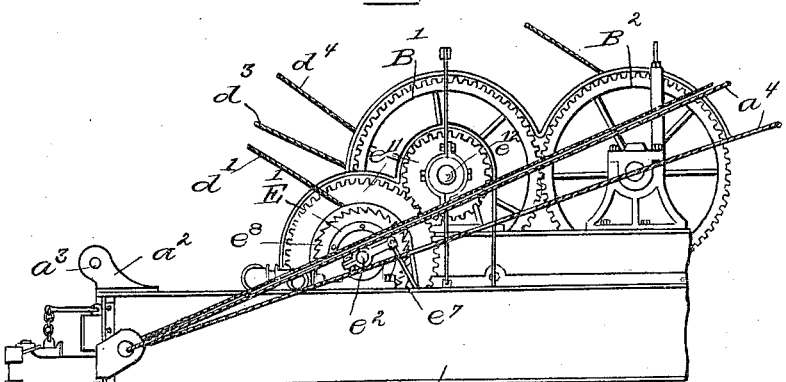

In said annexed drawings:—Figure 1 is a side elevational view of a machine embodying the improvements in question; Fig. 2, is a plan view on a larger scale of one end of said machine; Fig. 3 is a side elevation, and Fig. 4 a plan view of the outer end of the corresponding boom of the machine; Fig. 5 is a plan view on a larger scale than Fig. 2 of a portion of the hoisting mechanism; Fig. 6 is a corresponding side elevation of the latter; Figs. 7, 8 and 9 are detailed views on a still larger scale than Figs. 3 and 4 of portions of the boom.

The machine illustrated in the drawings is adapted to travel upon a railroad track, and to this end is shown as including a car body A which provides the frame or base of the machine, upon which the several operative parts are supported. Such base or frame is mounted on trucks $a$ of any approved construction, and may be made automobile, if desired, by the provision of suitable propelling means including sprocket chains $a^1$ leading to said trucks from the engine B mounted on the base. In addition to this engine, which is centrally located on the base, the latter carries two duplicate sets of winding drums $B^1$ $B^2$ $B^3$, such sets being respectively associated with a boom C mounted at the corresponding end of the base. The construction of this boom will first be noted, and then certain details of the hoisting mechanism, consisting of the winding drums just referred to, will be taken up and described.

The ordinary type of derrick, comprising a rotatable mast from which the boom is supported, or else a boom pivotally secured to a fixed mast is not well adapted to withstand the very heavy side strain and racking to which it would be subjected in the skidding of logs from first one side and then the other of the railway track upon which the machine is located, as is necessary in the service for which the present device is designed. Hence a mast rigidly mounted upon the lower frame has generally been preferred. Obviously, however, certain advantages are to be secured in having the boom mounted so as to be capable of a limited swinging movement, since in this way the vibration due to the irregular tension on the skidding line may be avoided, and the frame of the machine be relieved from undue jerks and jars; while, at the same time, the boom accommodates itself more readily to the operation of "decking" as the alining of the logs up parallel with the track is called. One construction of swinging boom adapted for the service just described, is set forth in my Patent No. 907,631, dated September 22, 1908. By the construction of the boom now to be described, I obtain substantially the same results, although by somewhat different means.

The boom C proper in the present machine, comprises two side members $c\ c$, Figs. 1 and 2, the lower ends of which are held in spaced supports $a^2$ on the base or frame of the machine. Preferably such supports consist of sockets in which such ends are pivotally secured by transversely disposed pins $a^3$, although in use, little or no pivotal movement about the axis thus provided is contemplated. In fact the boom is restrained against up and down movement by holding cables $a^4$ that pass from the outer end of each side member to the corresponding rear corner of the frame, where they are fixedly attached. It may further be remarked that the fit of the lower ends of boom members $c$ in sockets $a^2$ is sufficiently loose (see Fig. 5) to permit a slight lateral swaying of the members and thus of the boom.

The outer ends of the side members of the boom, instead of being rigidly secured together, as heretofore, are connected by a transversely disposed member $C^1$, the detailed construction of which will be best appreciated by reference to Figs. 3, 4, 7, 8 and 9. Such member $C^1$ is pivotally attached to outer ends of members $c$ respectively, by pivot pins $c^1$; and in construction the member is of a box-like character, being built up of channel sections $c^2$ held together by plates $c^3$. It further includes a rigid or integral rear extension $C^2$ that lies between the ends of the side members of the boom. Such extension or tongue, as it may be called, is resiliently connected with the adjacent portions of the side members, as shown in Fig. 7. To this end, a set of nested compression springs $c^4$ is disposed within such adjacent portion of each side member of the boom, in a transverse position, being held between two plates $c^5\ c^6$ freely movable inwardly to compress said spring, but prevented from escaping a box-like inclosure formed between walls of the side member, which latter is built up of channels tied together by plates or lacing in the usual fashion. Around said springs is passed a strap $c^7$, the outer looped portion of which is adapted to engage and draw inwardly the outermost $c^6$ of said plates, while its inner ends are secured to a block $c^8$ that forms a buffer adapted to similarly engage the innermost $c^5$ of the two plates upon outward actuation of the strap. Eye bolts $c^9$ are pivotally secured at their outer ends to said buffer, one above and the other below the same, by a bolt $c^{10}$ passing vertically therethrough the inner ends of said eye-bolts being in turn secured to an adjacent lateral wall of the rearward extension or tongue $C^2$ of transverse member $C^1$. The nuts $c^{11}$ on such eye-bolts are set a little distance inside the wall of the extension so as to allow a certain amount of play or looseness, and adjacent to the aperture in the wall through which the bolts pass, is secured a buffer $c^{12}$ which is adapted to come in contact with the buffer $c^8$ held between the inner ends of the strap, thus limiting the inward movement of the latter, or rather the lateral movement of the tongue, subject to compression of the springs upon further movement. A rectangular aperture $c^{13}$ in the outer wall of the boom member $c$ permits the strap the desired movement outwardly. A filler $c^{14}$, moreover, is inserted inside of the springs, so as to hold them in central position, such filler being in turn held in place by a bolt $c^{15}$ that passes through follower plate $c^6$.

By reason of the foregoing construction, it will be evident that each set of springs will be compressed upon movement of the tongue or extension (other than that allowed for by the slight play just referred to) whatever may be the direction of such movement, such movement being, in effect, a movement of oscillation about the double axis, provided by the two pins $c^1$ whereby member $C^1$ is pivotally secured to the outer ends of the side members $c$ of the boom.

Suspended substantially centrally from the forward portion of transverse member $c^1$, is a pair of skidding blocks $d$, over which the skidding lines or cables $d$ are designed to be passed, thence to extend in opposite directions from the outer end or peak of the boom. Similarly, guy lines $d^1$ are passed over blocks $D^1$ hung from each end of said transverse member. The free ends of the skidding lines are provided with tongs $d^2$ or other log gripping means, while, as will be of course, understood, the outer ends of the guy lines $d^1$ are designed to be attached to trees, stumps or other fixed objects, with a view to steadying the boom when said lines are drawn in and rendered taut.

To the rear of the resilient means, described above as being utilized to normally retain the side members of the boom in a predetermined position relative to each other, is a bar or supporting member $C^3$, arranged transversely of the boom and slidably supporting another block $D^2$, which is thus adapted to occupy a position adjacent to either side member of said boom. The line $d^3$ that passes over such last named block, is provided with gripping tongs $d^2$ similar to those utilized on the skidding lines, but said line is not as long as the skidding lines, being used merely in decking logs, as the operation of alining the latter with the track, after they have been drawn in by skidding lines $d$, is termed. By way of a fuller description of such operation, it may be stated, that when a log has been brought into a position in proximity to the track, the decking line is attached to the other end of such log, whereupon the latter may be swung around into the desired position, and if necessary, be drawn up on to the top of the accumulated pile of logs alongside the track. Since ordinarily one skidding line will be paid out while the other is being drawn in, a single decking line will obviously serve for use with both skidding lines. The drum $B^1$ for winding in said decking line is located forwardly of the two drums $B^2$ $B^3$ respectively utilized in winding in the skidding lines. The driving mechanism for operating said drums, being of familiar construction, need not here be noted in detail, except to observe that any one of said drums may be operated at will by throwing in a corresponding friction clutch, such clutches being operated by handles $b^1$ $b^2$ and $b^3$ respectively, as shown in Fig. 2.

In connection, however, with the winding drum for the decking line, I utilize a counter-weight arrangement for automatically unwinding said drum, and thereby paying out the line in order to facilitate the operation of decking. Such counter-weight means comprise simply a weight $D^3$ slidably supported upon the upper face of one of the side members or legs $c$ of the boom, to which weight is connected a cable $d^4$ that passes around a pulley $d^7$ at the outer end of the boom to a drum $d^5$ fixed to the drum $B^1$ for the decking line. Such drum $d^5$, however, is of smaller diameter than the decking line drum, proper, although the counter-weight cable is wound around the same in the same direction as that of the decking line. The mode of operation of the parts just described, will accordingly be obvious.

For drawing in the guy lines $d^1$, I provide drums E $E^1$ that may be independently operated from the same power mechanism employed in operating the drums $B^1$, $B^2$ $B^3$ previously described. Such guying drums are mounted on a shaft $e^2$ located just in front of the decking line drum, preferably at the outer ends of said shaft, so as to leave the intermediate space clear for the decking line $d^3$ and counter-weight cable $d^4$. These guying drums, normally freely rotatable upon the shaft, are adapted to be independently fixedly secured thereto, so as to rotate therewith, by means of friction clutches $e$ $e^1$ of the usual type. For the purpose of operating such clutches, I provide two cranks, the one $e^3$ being directly connected with the corresponding clutch in the usual manner, while the other $e^4$ is adapted to be operated through a rock shaft $e^5$ and lever $e^6$ located conveniently adjacent to the first-named crank. Inasmuch as said guying drums will only be used when setting up the machine for operation, and will be inoperative during the remainder of the stand in any particular locality, a pawl $e^7$ and ratchet $e^8$ are provided in connection with each drum, to lock the same against reverse movement such as would release the tension of the lines. To throw out such pawls, I provide a suitable hand-lever $e^9$, which is connected with the pawl of the drum farthest from the operator by a handled rock shaft $e^{10}$ in a fashion similar to that in which the corresponding friction clutch is connected. It is desirable, moreover, that operation of the shaft $e^2$ upon which said drums are mounted may be interrupted, except at those times when the shaft is actually used in rotating the drums. The gearing $e^{11}$ accordingly, whereby said shaft is connected to be driven from the shaft $b^5$ of the adjacent decking line drum runs normally free, but a clutch $e^{12}$ is provided to throw it in connection whenever desired.

It is not deemed necessary to additionally describe the general operation of the machine, in view of the explanation of the operation of its several parts, incidentally to the description of their construction. It will further be understood that the two ends of the machine or car and mechanism supported thereon, are counter-parts of each other, although oppositely disposed, the preceding description being hence devoted to but one such end of the same. It will further be understood that the lateral movement of the outer ends or peaks of the booms is not large in a machine of the dimensions illustrated; in other words, such movement will not be more than a foot or two for the purpose in hand, viz. the accommodation of such boom to the severe racking and side strains to which it is subjected in the service in hand, while still maintaining the same a substantially rigid structure. The same features of construction, however, that characterize the boom of the present machine may obviously be utilized in connection with a boom having a larger amplitude of movement, in which case a modification might require to be made in the character of the supports to which the lower ends of the side members of the boom are secured. As it has been remarked, enough play is readily allowed for between the castings that provide the supports and the terminals of the side members or legs of the boom respectively to permit said side members the desired amount of relative movement here desired.

In addition to the means thus provided for absorbing the vibration due to the irregular tension of the skidding lines and thus relieving the frame of the machine from undue jerks and jars, attention is directed in conclusion to the convenient decking line and to the provision made for easily and quickly setting up the machine through the independently operable power driven guying drums and the lines wound thereon.

Other modes of applying the principle of my invention may be employed instead of the one explained, change being made as regards the mechanism herein disclosed, provided the means stated by any one of the following claims or the equivalent of such stated means be employed.

I therefore particularly point out and distinctly claim as my invention:—

1. In hoisting mechanism, the combination with spaced supports, of a boom comprising side members respectively secured to said supports at their lower ends, the outer ends of said members being movable relatively to each other.

2. In hoisting mechanism, the combination with spaced supports, of a boom comprising side members respectively secured to said supports at their lower ends, the outer ends of said members being movable relatively to each other, and a member connecting the outer ends of said side members but permitting relative movement therebetween.

3. In hoisting mechanism, the combination with spaced supports, of a boom comprising side members respectively secured to said supports at their lower ends, and a member pivotally connecting the outer ends of said side members so as to permit relative movement therebetween.

4. In hoisting mechanism, the combination with spaced supports, of a boom comprising side members respectively secured to said supports at their lower ends, and a transversely disposed member pivotally connected with the outer ends of each side member so as to permit relative movement between the same.

5. In hoisting mechanism, the combination with spaced supports, of a boom comprising side members respectively secured at their lower ends to said supports, the outer ends of said members being connected but movable relatively to each other and such lower ends of said members having a limited independent movement about said supports.

6. In hoisting mechanism, the combination with spaced supports, of a boom comprising side members respectively secured to said supports at their lower ends, the outer ends of said members being connected but movable relatively to each other, and means normally retaining such outer ends of said members in a predetermined relative position.

7. In hoisting mechanism, the combination with spaced supports, of a boom comprising side members respectively secured to said supports at their lower ends, the outer ends of said members being movable relatively to each other, a member connecting the outer ends of said side members but permitting relative movement therebetween, and means normally retaining such outer ends of said members in a predetermined relative position.

8. In hoisting mechanism, the combination with spaced supports, of a boom comprising side members respectively secured to said supports at their lower ends, the outer ends of said members being movable relatively to each other, a member pivotally connecting the outer ends of said side members so as to permit relative movement therebetween, and means co-acting with said side members and said last named member to normally retain the former in a predetermined relative position.

9. In hoisting mechanism, the combination with spaced supports, of a boom comprising side members respectively secured to said supports at their lower ends, the outer ends of said members being movable relatively to each other, a transversely disposed member pivotally connected with the outer end of each side member so as to permit relative movement therebetween, and resilient means co-acting with said side members and said transverse member to normally retain the former in a predetermined relative position.

10. In hoisting mechanism, the combination with spaced supports, of a boom comprising side members connected at their outer ends and respectively secured at their lower ends to said supports and having a limited independent movement about said supports, and means normally retaining said members against such movement.

11. In hoisting mechanism, the combination with spaced supports, of a boom comprising side members respectively secured to said supports at their lower ends, the outer ends of said members being movable relatively to each other, a transversely disposed member pivotally connected with the outer end of each side member so as to permit relative movement therebetween, said transverse member extending rearwardly between said side members, and resilient means interposed between such extension and said side members, whereby the latter are normally retained in a predetermined relative position.

12. In hoisting mechanism, the combination with spaced supports, of a boom comprising side members respectively secured to said supports at their lower ends, the outer ends of said members being movable relatively to each other, a transversely disposed member pivotally connected with the outer end of each side member so as to permit relative movement therebetween, said transverse member extending rearwardly between said side members, and connections, including compression springs, between such extension and said side members, whereby the latter are normally retained in a predetermined relative position.

13. In hoisting mechanism, the combination with spaced supports, of a boom comprising side members respectively secured to said supports at their lower ends, the outer ends of said members being movable relatively to each other, a transversely disposed member pivotally connected with the outer end of each side member so as to permit relative movement therebetween, said transverse member extending rearwardly between said side members, and connections between such extension and said side members respectively, each of said connections including a set of nested compression springs, whereby said side members are normally retained in a predetermined relative position.

14. In hoisting mechanism, the combination with spaced supports, of a boom comprising side members respectively secured to said supports at their lower ends, the outer ends of said members being movable relatively to each other, a transversely disposed member pivotally connected with the outer end of each side member so as to permit relative movement therebetween, said transverse member extending rearwardly between said side members, and connections between such extension and said side members respectively, each of said connections including a set of nested compression springs, and a strap passing around said springs and pivotally attached at its inner end to said extension, whereby said springs are compressed upon movement of said extension in either direction, and side members normally retained in a predetermined relative position.

15. In a machine of the character described, the combination with a frame, of a boom supported thereon, a skidding line passing over the outer end of said boom, and a second line for decking logs passing over said boom at a point to the rear of such end.

16. In a machine of the class described, the combination with a frame, of a boom supported thereon, two skidding lines passing over the outer end of said boom to thence extend in opposite directions, and a third line passing over said boom at a point to the rear of such end and coöperative with either of aforesaid lines for decking logs.

17. In a machine of the class described, the combination with a frame, of a boom supported thereon, two blocks attached to the end of said boom, a third block mounted in said boom to the rear of such end, said third block being transversely shiftable of said boom, skidding lines passing over said first two blocks respectively, and thence extending in opposite directions, and a line for decking logs passing over said third block.

18. In a machine of the class described, the combination with a frame, of a boom supported thereon, two blocks attached to the end of said boom, a transverse member in said boom to the rear of such end, a third block slidably supported on said member, skidding lines passing over said first two blocks respectively and thence extending in opposite directions, and a line for decking logs passing over said third block.

19. In a machine of the character described, the combination with a frame, of a boom supported thereon, a skidding line passing over the outer end of said boom, a second line for decking logs passing over said boom at a point to the rear of such end, and means for automatically paying out said decking line.

20. In a machine of the character described, the combination with a frame, of a boom supported thereon, a skidding line passing over the outer end of said boom, a second line for decking logs passing over said boom at a point to the rear of such end, and counterweight means tending to pay out said decking line.

21. In a machine of the character described, the combination with a frame, of a boom supported thereon, two skidding lines passing over the farther end of said boom and thence extending in opposite directions, a third line passing over said boom at a point to the rear of such end and coöperative with either of aforesaid lines for decking logs, and counterweight means tending to pay out said decking line.

22. In a machine of the class described, the combination of a frame providing spaced supports, a boom comprising side members respectively secured to said supports at their lower ends, a member connecting the outer ends of said side members but permitting relative movement therebetween, and a skidding line supported by said member.

23. In a machine of the class described, the combination of a frame providing spaced supports, a boom comprising side members respectively secured to said supports at their lower ends, a transversely disposed member pivotally connected with the outer end of each side member so as to permit relative movement between the same, guy lines connected with said transverse member, a block secured to said member, and skidding line passing over said block.

24. In a machine of the class described, the combination of a frame providing spaced supports, a boom comprising side members respectively secured to said supports at their lower ends, a transversely disposed member pivotally connected with the outer end of each side member so as to permit relative movement between the same, guy lines connected with said transverse member, two blocks secured to said member, a third block supported between said side members to the rear of said transverse member, said third block being transversely shiftable of said boom, skidding lines passing over said first two blocks respectively and thence extending in opposite directions, and a line for decking logs passing over said third block.

25. In a machine of the class described, the combination of a frame providing spaced supports, a boom comprising side members respectively secured to said supports at their lower ends, a transversely disposed member pivotally connected with the outer end of each side member so as to permit relative movement between the same, guy lines connected with said transverse member, two blocks secured to said member, a third block supported between said side members to the rear of said transverse member, said third block being transversely shiftable of said boom, skidding lines passing over said first two blocks respectively and thence extending in opposite directions, a line for decking logs passing over said third block, and counterweight means tending to pay out said decking line.

26. In a machine of the class described, the combination of a frame providing spaced supports, a boom comprising side members respectively secured to said supports at their lower ends, a member connecting the outer ends of said side members but permitting relative movement therebetween, means normally retaining such outer ends of said members in a predetermined relative position, and a skidding line supported by said member.

27. In a machine of the class described, the combination of a frame providing spaced supports, a boom comprising side members respectively secured to said supports at their lower ends, a transversely disposed member pivotally connected with the outer end of each side member so as to permit relative movement between the same, resilient means co-acting with said side members and said transverse member to normally retain the former in a predetermined relative position, guy lines connected with said transverse member, a block secured to said member, and a skidding line passing over said block.

28. In a machine of the class described, the combination of a frame providing spaced supports, a boom comprising side members respectively secured to said supports at their lower ends, a transversely disposed member pivotally connected with the outer end of each side member so as to permit relative movement between the same, said transverse member extending rearwardly between said side members, resilient means interposed between such extension and said side members, whereby the latter are normally retained in a predetermined relative position, guy lines connected with said transverse member, two blocks secured to said member, a third block supported between said side members to the rear of said transverse member, said third block being transversely shiftable of said boom, skidding lines passing over said first two blocks respectively, and thence extending in opposite directions, and a line for decking logs passing over said third block.

29. In a machine of the class described, the combination of a frame providing spaced supports, a boom comprising side members respectively secured to said supports at their lower ends, a transversely disposed member pivotally connected with the outer end of each side member so as to permit relative movement between the same, said transverse member extending rearwardly between said side members, resilient means interposed between such extension and said side members, whereby the latter are normally retained in a predetermined relative position, guy lines connected with said transverse member, two blocks secured to said member, a third block supported between said side members to the rear of said transverse member, said third block being transversely shiftable of said boom, skidding lines passing over said first two blocks respectively and thence extending in opposite directions, a line for decking logs passing over said third block, and counter-weight means for paying out said decking line.

30. In a machine of the class described, the combination of a frame providing spaced supports, a boom comprising side members respectively secured at their lower ends to said supports, the outer ends of said members being connected but movable relatively to each other, and holding cables from such outer ends to said frame.

31. In a machine of the class described, the combination of a frame providing spaced supports, a boom comprising side members respectively secured at their lower ends to said supports, a member connecting the outer ends of said side members but permitting relative movement therebetween, and a holding cable from each such outer end to said frame.

32. In a machine of the class described, the combination of a frame providing spaced supports, a boom comprising side members respectively secured at their lower ends to said supports, a member connecting the outer ends of said side members but permitting relative movement therebetween, a holding cable from each such outer end to said frame, and guy lines connected with said connecting member.

33. In a machine of the class described, the combination of a frame providing spaced supports, a boom comprising side members respectively secured at their lower ends to said supports, a transversely disposed member pivotally connected with the outer ends of each side member so as to permit relative movement between the same, resilient means co-acting with said side members and said transverse member to normally retain the former in a predetermined relative position, a holding cable from each such outer end to said frame, and guy lines connected with said transverse member.

34. In a machine of the class described, the combination of a frame providing spaced supports, a boom comprising side members respectively secured at their lower ends to said supports, a transversely disposed member pivotally connected with the outer ends of each side member so as to permit relative movement between the same, resilient means co-acting with said side members and said transverse member to normally retain the former in a predetermined relative position, a holding cable from each such outer end to said frame, guy lines connected with said transverse member, two blocks secured to the latter, a third block supported between said side members to the rear of said transverse member, said third block being transversely shiftable of said boom, skidding lines passing over said first two blocks respectively and thence extending in opposite directions, and a line for decking logs passing over said third block.

35. In a machine of the class described, the combination of a frame providing spaced supports, a boom comprising side members respectively secured at their lower ends to said supports, a transversely disposed member pivotally connected with the outer ends of each side member so as to permit relative movement between the same, resilient means co-acting with said side members and said transverse member to normally retain the former in a predetermined relative position, a holding cable from each such outer end to said frame, guy lines connected with said transverse member, two blocks secured to the latter, a third block supported between said side members to the rear of said transverse member, said third block being transversely shiftable of said boom, skidding lines passing over said first two blocks respectively and thence extending in opposite directions, a line for decking logs passing over said third block, and counterweight means tending to pay out said decking line.

36. In a machine of the class described, the combination of a frame, a boom mounted upon one end of said frame, a holding cable from said boom to said frame, two guying lines passing over the end of said boom and thence extending in opposite directions, drums for winding in said guying lines respectively, and means for operating said drums comprising a shaft normally rotatably supporting the same, friction clutches for independently securing said drums to said shaft, and clutch-controlled power-means for rotating said shaft.

37. In a machine of the class described, the combination of a frame, a boom mounted upon one end of said frame, a holding cable from said boom to said frame, two guying lines passing over the end of said boom and thence extending in opposite directions, drums for winding in said guying lines respectively, and means for operating said drums comprising a shaft normally rotatably supporting the same, friction clutches for independently securing said drums to said shaft, clutch-controlled power means for rotating said shaft, and independently operable pawl-and-ratchet means for locking said drums.

38. In a machine of the character described, the combination of a frame, a boom mounted upon one end of said frame, a holding cable from said boom to said frame, skidding lines passing over the end of said boom and thence extending in opposite directions, a line for decking logs passing over said boom to the rear of said skidding lines, power driven winding drums for said lines respectively, two guying lines passing over the end of said boom and likewise thence extending in opposite directions, drums for winding in said guying lines respectively, and means for operating said last-named drums, the latter being located adjacent to one of said first-named drums, and said operating means comprising a shaft normally rotatably supporting said drums, friction clutches for independently securing said drums to said shaft, and clutch-controlled gearing connecting said shaft with the shaft of the adjacent first-named drum.

39. In a machine of the character described, the combination of a frame, a boom mounted upon one end of said frame, a holding cable from said boom to said frame, skidding lines passing over the end of said boom and thence extending in opposite directions, a line for decking logs passing over said boom to the rear of said skidding lines, power driven winding drums for said lines respectively, two guying lines passing over the end of said boom and likewise thence extending in opposite directions, drums for winding in said guying lines respectively, and means for operating said last-named drums, the latter being located adjacent to one of said first-named drums, and said operating means comprising a shaft normally rotatably supporting said drums, friction clutches for independently securing said drums to said shaft, clutch-controlled gearing connecting said shaft with the shaft of the adjacent first-named drum, and independently operable pawl-and-ratchet means for locking said guying drums.

Signed by me this 9th day of September, 1909.

JOHN R. McGIFFERT.

Attested by—
J. J. LUMM,
H. J. SULLIVAN.